US012531632B2

(12) United States Patent
Perrin et al.

(10) Patent No.: US 12,531,632 B2
(45) Date of Patent: Jan. 20, 2026

(54) SATELLITE SYSTEM AND METHOD FOR GEOLOCATING A RADIOFREQUENCY TRANSMITTER

(71) Applicant: THALES, Courbevoie (FR)

(72) Inventors: Olivier Perrin, Toulouse (FR); Roland Baudin, Toulouse (FR); Patrick Cordier, Toulouse (FR)

(73) Assignee: THALES, Courbevoie (FR)

( * ) Notice: Subject to any disclaimer, the term of this patent is extended or adjusted under 35 U.S.C. 154(b) by 287 days.

(21) Appl. No.: 18/227,994

(22) Filed: Jul. 31, 2023

(65) Prior Publication Data

US 2024/0048233 A1   Feb. 8, 2024

(30) Foreign Application Priority Data

Aug. 4, 2022   (FR) .................................... 2208076

(51) Int. Cl.
*H04B 7/185* (2006.01)
*H04J 1/04* (2006.01)
(52) U.S. Cl.
CPC ............ *H04B 7/18547* (2013.01); *H04J 1/04* (2013.01)
(58) Field of Classification Search
CPC ............ H04B 7/18547; H04B 7/18515; H04B 7/18528; H04J 1/04; G01S 3/043; G01S 5/0221; G01S 5/02695
See application file for complete search history.

(56) References Cited

U.S. PATENT DOCUMENTS

| 2010/0222005 | A1* | 9/2010 | Jacomb-Hood | ...... H04B 7/0894 |
| | | | | 455/39 |
| 2014/0160970 | A1* | 6/2014 | Beeler | ................ H04B 7/18543 |
| | | | | 370/252 |
| 2018/0006673 | A1 | 1/2018 | Pezet et al. | |
| 2018/0205583 | A1* | 7/2018 | Chang | .................. H04B 7/2041 |
| 2018/0278322 | A1 | 9/2018 | Mengwasser et al. | |

* cited by examiner

*Primary Examiner* — Ashley Shivers
(74) *Attorney, Agent, or Firm* — BakerHostetler

(57) ABSTRACT

A satellite configured to operate radiofrequency communications from one or more antenna systems. The satellite further comprises a device dedicated to locating RF equipments comprising: a reception antenna comprising a plurality N of radiating elements configured to receive an RF signal, analogue means for frequency multiplexing the signals received on the N radiating elements, means for transmitting the multiplexed signals to a satellite station on the ground. A complete satellite system further comprising a satellite station and computation means configured to receive the multiplexed signals, demultiplex them and implement goniometry processing operations to determine the position of the RF equipment to be located, and to the associated locating method.

6 Claims, 3 Drawing Sheets

SATELLITE SYSTEM AND METHOD FOR GEOLOCATING A RADIOFREQUENCY TRANSMITTER

CROSS-REFERENCE TO RELATED APPLICATION

This application claims priority to foreign French patent application No. FR 2208076, filed on Aug. 4, 2022, the disclosure of which is incorporated by reference in its entirety.

FIELD OF THE INVENTION

The invention falls within the field of the satellite geolocating of radiofrequency (RF) transmitters, and relates more particularly to a system and method for geolocating a radiofrequency transmitter operated by a system involving a conventional communications satellite.

BACKGROUND

Satellite communications are booming, but are increasingly frequently subject to interference by radiofrequency equipments transmitting signals in the frequency band of the communication channel, either accidentally by equipments linked with other satellites, or deliberately by equipments aiming to disrupt the satellite communications.

To operate the satellite, it is useful to know the direction of arrival of the interfering signal, in order to locate the ground equipment originating the interfering transmissions, and to take all the measures necessary to revert to a nominal operation of the communications system.

The determination of the position of a radiofrequency transmitter from a satellite can be done by using an angle error measurement method. This concept, widely used in radars to locate the targets, is based on the formation of three beams from three antennas, an array antenna or a specific angle error measurement source:

- a sum channel,
- two difference channels, in two orthogonal axes, typically the East-West and North-South axes.

This solution makes it possible to achieve very good location accuracy performance levels, but over very small angular coverage, of the order of a few tenths of a degree. It is therefore primarily intended for applications such as compensation for the misalignment of the satellites, and is not suited to the locating of a transmitter over all of the zone of coverage of a satellite, which is typically around ten degrees.

Moreover, this solution is not compatible with the presence of a co-frequency traffic signal (that is to say the simultaneous transmission of a traffic signal and of an interfering signal in the same frequency channel) since only the signal of interest should be present.

The determination of the position of the radiofrequency transmitters by radio goniometry processing operations, which consist in acquiring a same signal from several antennas and/or sensors then in implementing processing operations in order to determine the direction of arrival of this signal, is more suited to the locating of a interfering transmitter over all of the zone of coverage of a satellite, inasmuch as these processing operations are compatible with the co-frequency transmissions. However, they require a satellite configured to receive the RF signals transmitted by the interfering transmitter, transpose them in frequency, digitize them and process them in an onboard computer.

While this type of solution is conventional, it does however present the defect of being restrictive in development time and of being costly, because it requires the development, the integration and the validation of signal conversion/digitization chains and of an onboard computer dedicated to the goniometry function. Furthermore, this solution significantly increases the consumption of the satellite.

Another known solution is to receive the radiofrequency signals on board of the satellite, to transpose them in frequency, to digitize them on board, then to send them to the ground for the geolocation processing operations to be performed. The transmission of the signals to the ground can be done for example by using the telemetry/remote control link of the satellite. This solution avoids the development of a computer on board the satellite, but still requires conversion and digitization chains to be carried on board the satellite, which requires significant time for the development, the integration and the validation, and therefore entails a high cost.

To mitigate these drawbacks, one object of the invention is to propose a solution that makes it possible to geolocate a radiofrequency transmitter from a "conventional" satellite, that does not require the development of equipment specific to the locating function. The aim of this solution is to speed up the development and the integration of the communication satellites, and to reduce the costs thereof.

For that, it relies on two elements:
- the transmission to the ground of the radiofrequency signals received from analogue equipments that do not require specific developments,
- the implementation on the ground of the goniometry processing operations.

SUMMARY OF THE INVENTION

To this end, the present invention describes a satellite configured to operate radiofrequency communications from one or more antenna systems. The satellite according to the invention further comprises a device dedicated to locating RF equipments. It comprises:

- a reception antenna comprising a plurality N of radiating elements configured to receive an RF signal,
- analogue means for frequency multiplexing the N RF signals received on the N radiating elements, configured to transpose said N RF signals received on the N radiating elements around distinct centre frequencies distributed into a given frequency band and to combine them, and
- means for transmitting the N frequency-multiplexed RF signals to a satellite station on the ground for the implementation of goniometry processing operations.

According to an embodiment of the invention, the analogue means for frequency multiplexing the N RF signals received on the N radiating elements comprise N analogue bandpass filters having substantially identical bandwidths and N analogue transposition means configured to transpose said signals such that the deviation between two centre frequencies of transposed signals is greater than or equal to the bandwidth of the N analogue bandpass filters.

Advantageously, the satellite is configured such that the frequency band in which the N frequency-multiplexed RF signals are retransmitted is reserved for these retransmissions.

According to an embodiment of the satellite according to the invention, the number N of radiating elements of the reception antenna of the device dedicated to locating RF equipments is less than 10.

The invention also describes a satellite communications system that makes it possible to locate a radiofrequency transmitter comprising a satellite according to the invention, and one or more satellite stations on the ground, the satellite and the stations being configured to make it possible together to calibrate the system by:
  the transmission of a calibration signal from a satellite station whose position is known,
  the reception of said calibration signal on a plurality of radiating elements, the frequency multiplexing of the calibration signals received on said plurality of radiating elements and the retransmission of the frequency-multiplexed calibration signals, by the device dedicated to locating RF equipments of the satellite,
  the reception, by a satellite station, of the frequency-multiplexed calibration signals retransmitted by the satellite,
  the demultiplexing and the digitization of the calibration signals, and the implementation of goniometry processing operations on the demultiplexed and digitized calibration signals, so as to calculate:
    a direction of arrival of the calibration signal,
    a position of the satellite station transmitting the calibration signal, then
    a calibration deviation between the known position of the satellite station transmitting the calibration signal and the position of the satellite station transmitting the calibration signal determined using the goniometry processing operations
then to make it possible together to determine the position of an RF equipment transmitting an interfering signal by:
  the reception of an RF signal comprising said interfering signal on a plurality of radiating elements, the frequency multiplexing of the RF signals received on said plurality of radiating elements and the retransmission of the frequency-multiplexed RF signals, by the device dedicated to locating RF equipments of the satellite,
  the reception, by a satellite station, of the frequency-multiplexed RF signals transmitted by the device dedicated to locating RF equipment of the satellite,
  the demultiplexing and the digitization of said frequency-multiplexed RF signals, the implementation of a goniometry algorithm on the demultiplexed and digitized RF signals so as to determine a direction of arrival of the interfering signal, the calculation of a position of the RF equipment transmitting said interfering signal, and the correction of the calculated position by the calibration deviation.

Finally, the invention relates to a method for determining the position of a radiofrequency equipment in a satellite communications system comprising a satellite as described previously, and one or more satellite stations on the ground. The method comprises:
  a step of calibration of said satellite communications system, by:
    a substep of transmission of a calibration signal from a satellite station whose position is known,
    a substep of reception of the calibration signal on a plurality of radiating elements, of frequency multiplexing of the calibration signals received on said plurality of radiating elements and of retransmission of the frequency-multiplexed calibration signals, by the device dedicated to locating RF equipments of the satellite,
    a substep of reception, by a satellite station, of the frequency-multiplexed calibration signals retransmitted by the satellite,
    a substep of demultiplexing and of digitization of said calibration signals, and of implementation of goniometry processing operations on the demultiplexed and digitized calibration signals, so as to determine a direction of arrival of the calibration signal, a position of the satellite station transmitting the calibration signal, then a calibration deviation between the known position of the satellite station transmitting the calibration signal and the position of the satellite station transmitting the calibration signal determined using the goniometry processing operations;
  one or more steps of determination of the position of an RF transmitter transmitting an interfering signal, by:
    a substep of reception of an RF signal comprising said interfering signal on a plurality of radiating elements, of frequency multiplexing of the RF signals received on said plurality of radiating elements and of retransmission of the frequency-multiplexed RF signals, by the device dedicated to locating RF equipments of the satellite,
    a substep of reception, by a satellite station, of the frequency-multiplexed RF signals transmitted by the device dedicated to locating RF equipments of the satellite,
    a substep of demultiplexing and of digitization of said frequency-multiplexed RF signals, then of implementation of goniometry processing operations on the demultiplexed and digitized RF signals so as to determine a direction of arrival of the interfering signal, of calculation of a position of the radiofrequency equipment transmitting said interfering signal, and of correction of the calculated position by the calibration deviation.

BRIEF DESCRIPTION OF THE DRAWINGS

The invention will be better understood and other features, details and advantages will become more apparent on reading the following description, given in a nonlimiting manner, and using the attached figures, given by way of example, in which.

Identical references can be used in different figures when they designate identical or comparable elements.

DETAILED DESCRIPTION

Figure 1:
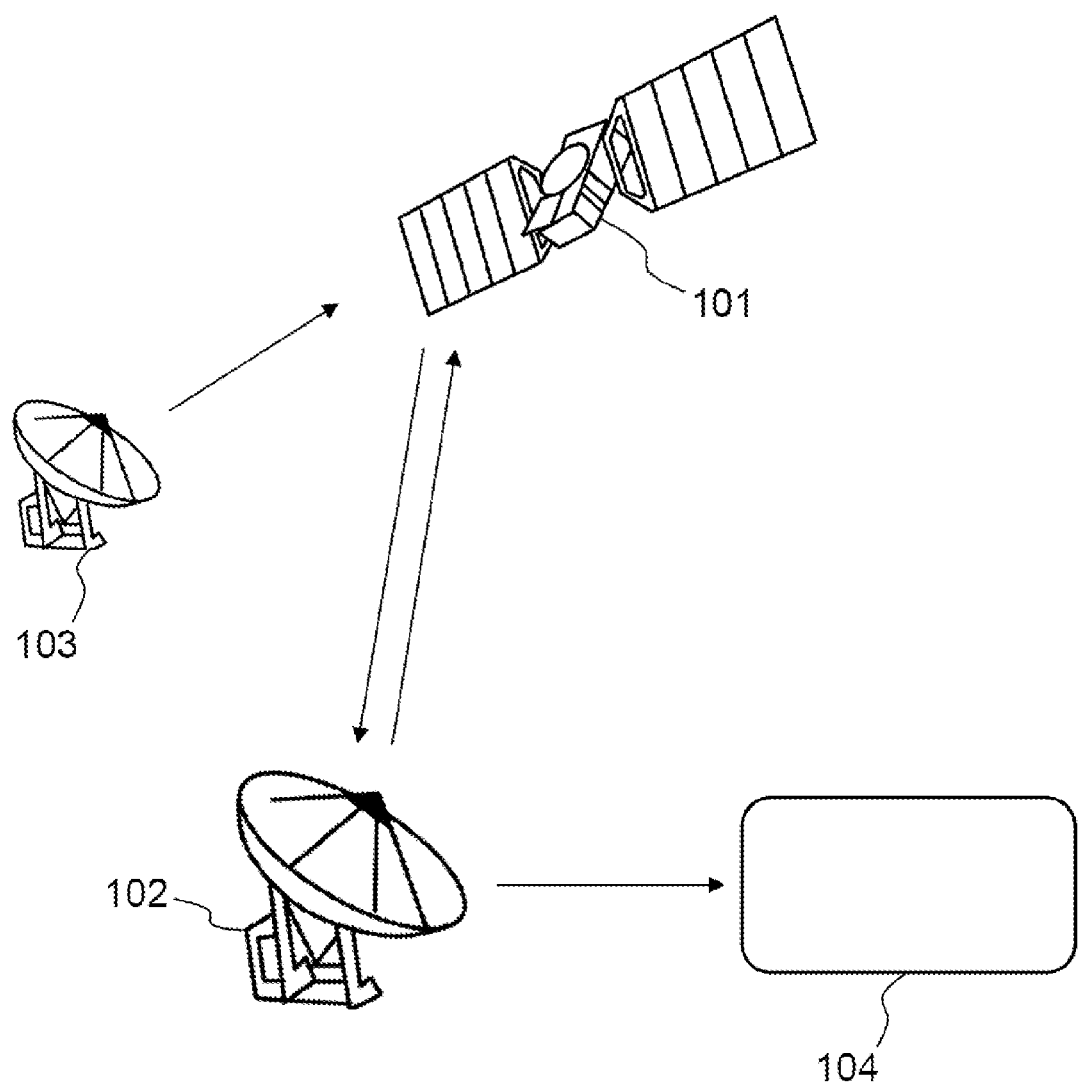
FIG. 1 represents an example of a satellite transmission system suitable for implementing the invention.

FIG. 1 represents an example of a satellite transmission system suitable for implementing the invention. It comprises a satellite 101 configured to operate radiofrequency communications, such as, for example, a satellite broadcasting digital television, a telephony satellite, an observation satellite, a satellite for a satellite positioning system (GNSS), or any other type of satellite. The satellite can equally be a geostationary or moving satellite. It can for example be configured to transmit/receive in the frequency band C (from 3.4 GHz to 7.075 GHz), Ku (from 10.70 GHz to 12.75 GHz) and/or Ka (from 20 GHz to 30 GHz).

The satellite 101 is generally controlled by a satellite gateway such as the station 102, through a bidirectional remote control and telemetry (TC/TM) link. It is configured to receive/send data from/to one or more satellite stations, like the station 102 and/or other stations on the ground. This configuration corresponds to a satellite system according to the prior art, configured to operate one or more communication missions, and obvious variations can be made thereto, for example by operating the remote control link and the telemetry link from two different stations.

The satellite system according to the invention is distinguished from the prior art in that the satellite 101 is further configured to allow the location of a radiofrequency equipment such as the transmitter 103, whose transmissions are likely to disturb those of the satellite, whether deliberately or accidentally. It can concern for example a badly oriented transmitter belonging to a third-party communications system, a satellite station of the system whose transmissions are not controlled, or an equipment specifically designed to disturb the uplink to the satellite (interfering transmitter).

To perform this location function, the satellite comprises, in addition to one or more antenna systems and equipments allowing it to operate its main communication function or functions, a device allowing the system to ensure an interfering radiofrequency equipment location function. This device is configured to receive RF signals on a plurality of radiating elements of an array antenna, to frequency multiplex them, then to retransmit them to a ground station in a given frequency band, which can be different from the frequency band of the received signals. A ground station comprising computation means or linked to an equipment 104 comprising computation means is configured to receive these signals, demultiplex them and implement goniometry processing operations in order to locate the interfering radiofrequency equipment. In FIG. 1, the ground station responsible for the reception of the multiplexed signals is the station 102 operating the remote control/telemetry link, but any ground station could be able to recover these signals and to process them.

When the goniometry processing operations, and possibly the demultiplexing of the signals, are performed by distinct computation means 104 of the satellite station 102, the latter is then responsible for the digitization of the signals, possibly the demultiplexing thereof, then the transmission thereof to the equipment 104.

Figure 2:
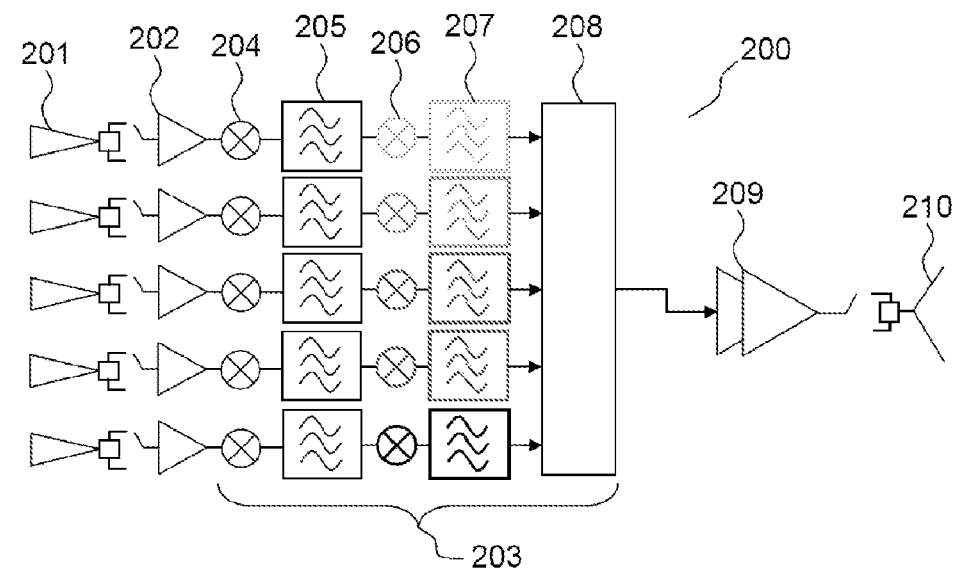
FIG. 2 represents an embodiment of a device dedicated to locating RF equipments embedded on a satellite so as to implement the invention.
Figure 2:
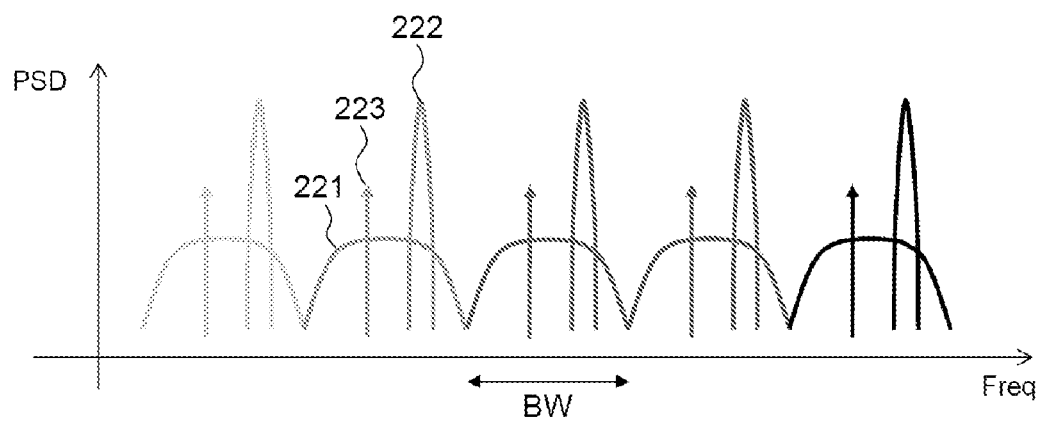

The top of FIG. 2 represents an embodiment of a device 200 dedicated to an RF equipment location function, embedded on a satellite. It allows the retransmission to a ground station of the analogue signals received on different radiating elements of an antenna. In the example of FIG. 2, and in a nonlimiting manner, the device is configured to be embedded on a communications satellite for which the uplink is operated in the Ku band. In this band there can be useful traffic signals associated with the main communications mission of the satellite, as well as one or more interfering signals, or interfering transmitters. The downlink, in which the frequency-multiplexed signals are returned, is operated in the Ka band. These two bands are mentioned by way of illustration only.

The device 200 dedicated to the locating function comprises an array antenna, with or without parabolic reflector, and a plurality N of radiating elements 201 configured to allow the reception of a signal in a given frequency band, here the Ku band. Each signal can be processed by one or more low-noise amplification 202 and filtering stages, in order to reduce the noise present on the received signals.

The device 200 also comprises analogue means 203 for frequency multiplexing the N received signals. These multiplexing means can for example comprise:

N identical analogue transposition means 204, configured to transpose the signals from their frequency band to a common frequency band in the manner of repeaters, for example to a given frequency in the Ka band for their retransmission to the ground, N identical analogue bandpass filters 205, configured to limit to a width BW the bandwidth of the N signals acquired on the radiating elements 201 and to reject the harmonics that may result from the frequency transposition 204, N analogue transposition means 206, configured to transpose the signals from the common frequency band by applying to each of them a unique frequency offset in order for them to be distributed in a given frequency band, preferably regularly. The frequency offset between the signals is such that the deviation between two centre frequencies of transposed signals is greater than or equal to the bandwidth BW of each of the N analogue bandpass filters 205, a combiner 208 of analogue signals with N inputs and one output, configured to sum the N filtered and transposed signals, in order to generate a signal corresponding to the frequency multiplexing of the N signals.

The analogue multiplexing means 203 can also comprise N analogue bandpass filters 207, centred around centre frequencies of the transposed signals, so as to reject any harmonics linked to the frequency transposition 206.

In an equivalent manner, the analogue transposition can be performed in a single step by the analogue transposition means 206, in which case the elements 204 and 205 are no longer necessary.

Other equivalent arrangements are possible and would produce equivalent results, for example by reversing the positions of the filters and of the transposition means, by adding other analogue filters, and/or by performing more signal transposition steps.

The device 200 dedicated to locating RF equipments embedded on the satellite finally comprises a power amplifier 209 and transmission means 210 such as a transmission antenna.

The bottom of FIG. 2 is a frequency representation of the signals retransmitted by the satellite. The X axis represents the frequency, and the Y axis the power spectral density (PSD) of the transmitted signals. In this example, the device 200 dedicated to locating comprises five radiating elements. Each radiating element receives a signal which comprises a useful signal part 221 and an interfering signal part 222. The five signals are filtered and frequency transposed, so that the signals have equivalent bandwidths BW, and that each signal has a centre frequency 223 away by at least BW from that of the other signals. Advantageously, the centre frequencies are evenly distributed in a given frequency band, the width of which is greater than or equal to N*BW. In FIG. 2, the elements specific to a signal are represented in different grey levels.

The satellite station 102 on the ground receiving the multiplexed signals is configured to digitize them, demultiplex them, and implement goniometry processing operations making it possible to determine the direction of arrival of the interfering signal, and consequently the position of the RF transmitter, or to transmit the digitized signals, multiplexed or not, to computation means 104 configured to determine the position of the RF transmitter. It therefore comprises at least a reception antenna with one or more radiating elements, one or more low-noise amplifiers associated with one or more bandpass filters, and an analogue-to-digital converter. The digitization can be done:

on the received signal, which comprises all of the multiplexed signals, either directly on the carrier frequency at which the signal is transmitted, or after transposition around a carrier frequency better suited to its digitization, in which case the multiplexed signals are then separated using digital filters, or independently for each of the multiplexed signals, by separating them from their carrier frequency using frequency converters and analogue filters, then by digitizing them separately.

Thus, the goniometry processing operations can be implemented on all of the signals acquired by the N radiating elements 201 of the device 200 dedicated to locating the satellite, in order to locate the RF transmitter or transmitters of interfering signals.

To this end, many goniometry algorithms are known. The best suited are the so-called "high resolution" processing operations, such as, for example, the MUSIC (acronym for MUltiple SIgnal Classification), ESPRIT (acronym for Estimation of Signal Parameter via Rotational Invariance Technique), MinNorm (acronym for Minimum Norm) algorithms, which make it possible to determine the direction of arrival of one or more signals acquired by several sensors with very great accuracy, but all types of multi-source goniometry algorithms can be envisaged. For that, the interfering signals can be characterized for example by their bandwidth, their power, their instants or frequencies of transmission, their waveform, etc. Knowing the position and the orientation of the satellite, it is possible to determine the position of the radio equipment originating the interfering signal from the direction of arrival of the signals.

All types of additional processing operations intended to enhance the quality of the transmitted signals can advantageously be implemented to correct the transformations undergone by the signal during its transmission between the interfering equipment, the satellite and the satellite reception station on the ground, such as, for example, the satellite pointing errors, the Doppler effect, the variations of the transfer function as a function of the frequency, the compensation of the nonlinearities of the amplifiers, the compensation of the frequency deviations, the time synchronization offsets, etc. These compensations make it possible to enhance the quality of the signals processed by the goniometry algorithm, and therefore the accuracy of the location function.

The device 200 dedicated to locating embedded on the satellite 101 is totally analogue, which allows it to be able to be implemented without requiring developments, integration and testing of an onboard computer specifically dedicated to the location function. However, the analogue equipments of the device necessarily present imperfections affecting the quality of the locating, which is why a preliminary calibration phase is necessary to guarantee the performance of the location function of the system. Indeed, in the absence of calibration, the imperfections of the equipments passed through by the signals as they are processed in the satellite, or the inaccuracies on the orientation of the satellite, are likely to generate positioning errors that can range up to several degrees of deviation.

The calibration of the system is done by the transmission of a specific signal from a station on the ground whose position is known accurately (georeferenced or obtained using a satellite positioning device such as a GNSS (acronym for Global Navigation Satellite Systems, or geolocation and navigation by a satellite system)) receiver. The signal can for example be a signal of AWG (acronym for Arbitrary Waveform Generator) type, spread throughout an analysis band, but any type of signal can be used provided that it has good self-correlation properties. The satellite 101 retransmits, to a satellite station of the system, the signals received by the radiating elements of its device 200 dedicated to locating, after having frequency multiplexed them. The station on the ground 102, possibly linked to remote computation means 104, is configured to digitize and demultiplex the received signals, and implement goniometry processing operations in order to locate the ground station transmitting the calibration signal. The error between the known position of the ground station transmitting the calibration signal and its position determined using the location function constitutes the correction to be made to the next position measurements.

The calibration can be performed just once, at the start of the operation of the satellite, or each time the location function is implemented by the satellite system. It can advantageously be repeated regularly in order to adapt to the variations of the characteristics of the device 200 embedded in the satellite. Successive measurements can be performed in order to average the calibration deviation to reduce any measurement errors linked for example to the white noise or to the propagation.

The satellite system according to the invention makes it possible to accurately locate a radiofrequency equipment relying on two principles:
a device 200 embedded in the satellite 101 allowing the acquisition of a radiofrequency signal on several radiating elements,
the transmission of the signals acquired on the radiating elements of the satellite to a ground station 102 for the implementation of goniometry processing operations.

This solution addresses the problem posed inasmuch as it is not necessary to develop specific onboard equipments to digitize the received signals and incorporate the processing operations necessary to the location function. Indeed, the only equipments necessary on board the satellite are known analogue equipments operating conventional functions not requiring any particular hardware development and requiring no software development. There are in this case a series of analogue repeaters disposed in parallel, the target frequency of which allows the frequency multiplexing of the signals when their outputs are linked to a signal combiner. The development plan for such a solution is therefore extremely short and inexpensive because it considerably reduces the system design, validation and qualification steps, which renders it compatible with the short plannings generally required for the conventional telecommunication systems, with low development costs.

The solution can be adapted to any telecommunications satellite, since it is performed using an additional device 200 specific to the location function. Indeed, the use for the purposes of locating antennas handling the other functions of the satellite is generally not possible:
when the satellite is provided with a conventional reflector satellite antenna, with a single radiating element, it is not possible to implement goniometry processing operations because the direction of arrival information extracted by goniometry is borne by the phase-shift between the signals received from different channels constituting the antenna network,
when the satellite has an array antenna, the implementation of the invention could be possible. However, the minimum gain performance levels required to ensure the link budget mean that these antennas have a very large number of radiating elements (typically around 50 or more). This high number results from the need to obtain a sufficient antenna surface, and from the limitation of the size of the radiating elements given the array lobes. The implementation of goniometry processing operations on all of these radiating elements to handle the location function would be suboptimal because the frequency multiplexing of the signals received on each of the radiating elements would use a significant bandwidth following the frequency multiplexing implemented. The implementation of the location function on a sub-part of these radiating elements would make it possible to limit the band consumed. However, the antennas are adapted as a function of the specifications specific to their function. Different specifications for the functions of communication (directivity, signal-to-interference ratio C/I, isolation, etc.) and of location (number of interfering elements to be located, angular accuracy, etc.) are reflected generally by different optimal definitions of the antennas, notably with respect to the mesh of the array. Because of this, the performance levels of a location function resulting from the goniometry processing operations implemented on acquisitions made by a communications antenna would be sub-optimal.

Introducing on the satellite an antenna device 200 specific to the location function makes it possible to adapt the radiating elements to the coverage sought for the location function by their number, size, form and position, so as to exhibit a gain that is sufficient over this coverage without generating ambiguities of direction of arrival (phenomenon close to the array lobes for beam-forming). The number of radiating elements depends on the number of transmitters to be located. An order of magnitude consists in using twice as many radiating elements as transmitters to be located simultaneously, and this is why it should be greater than 2, and is typically less than 10, and advantageously less than or equal to 6.

The additional device 200 has only a small payload overhead on the satellite since the number of radiating elements of the antenna of the device dedicated to the location function can be very much reduced.

The multiplexing of the signals in the frequency domain has a cost in bandwidth proportional to the number of radiating elements used by the device 200, since the bandwidth necessary to the location function is at least N*BW. However, the frequency multiplexing is preferred to a time multiplexing because the time multiplexing would have to be performed:
  either by the implementation of delay lines on each of the channels on board the satellite, which leads to a cost in terms of surface and weight,
  or by the acquisition of signals on the different elements at distinct moments, which is not compatible with the demands of the goniometry algorithms.

Furthermore, the downlink frequency band is generally higher than the uplink, with greater bandwidth availability, which is advantageous for the frequency multiplexing.

Another advantage of the proposed solution lies in its flexibility and its open-endedness: the goniometry processing operations are implemented on the ground, which eliminates all the constraints of integration, the complexity of implementation, the problems of consumption and the cost. Furthermore, the updates to the processing software are notably easier on the ground than in a computer on board the satellite.

The invention therefore relates to a satellite having a device 200 dedicated to locating as described previously, as well as to a system comprising a satellite 101 according to the invention and one or more stations 102 on the ground. The stations on the ground and the satellite are configured to make it possible together to calibrate the system by:
  the transmission of a calibration signal from a satellite station whose position is known,
  the reception of the calibration signal on a plurality of radiating elements, the frequency multiplexing of the calibration signals received on said radiating elements and the retransmission of the frequency-multiplexed calibration signals, by the device dedicated to locating RF equipments of the satellite,
  the reception, by the satellite station originating the transmission of the calibration signal or by another satellite station 102 on the ground, of the frequency-multiplexed calibration signals retransmitted by the satellite,
  the digitization and the demultiplexing of these signals, and the implementation of goniometry processing operations on the demultiplexed and digitized calibration signals, so as to determine a direction of arrival of the calibration signal, by the station on the ground having received the signals, possibly associated with computation means 104 to which it is linked. This direction of arrival is then used to determine the location of the station transmitting the calibration signal by associating it with the position and with the orientation of the satellite, then a calibration deviation between the known position of the satellite station transmitting the calibration signal and the position determined by the goniometry processing operations is measured.

The equipments of the system are also configured to make it possible together to determine the position of a radiofrequency RF equipment 103 originating an interfering signal by:
  the acquisition of an RF signal comprising the interfering signal on a plurality of radiating elements, the frequency multiplexing of the RF signals received on said radiating elements and the retransmission of the frequency-multiplexed RF signals, by the device dedicated to locating RF equipments of the satellite,
  the reception, by a satellite station 102, of the frequency-multiplexed RF signals transmitted by the satellite,
  the demultiplexing and the digitization of said RF signals, by the satellite station 102 or computation means 104 to which it is linked, the implementation of goniometry processing operations on the demultiplexed and digitized RF signals to determine a direction of arrival of the interfering signal, the calculation of a position of the interfering equipment 103 by using the direction of arrival of the interfering signal, the position of the satellite 101 and its orientation, and the correction of this position by the calibration deviation calculated in the calibration phase.

The invention also relates to a method for determining the position of an RF equipment in a satellite system according to the invention.

Figure 3:
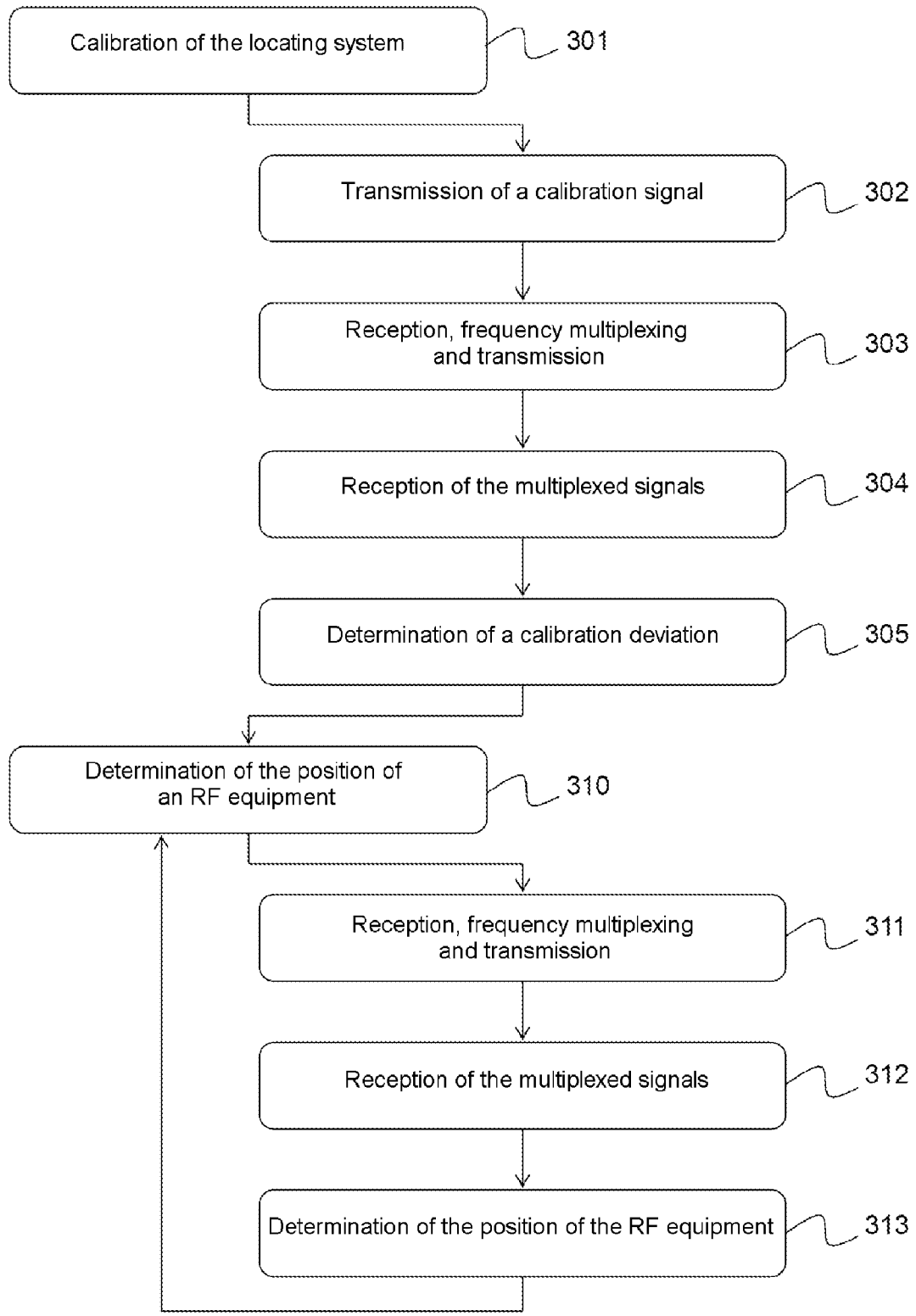
FIG. 3 is a flow diagram representing the steps of a method for locating a radiofrequency equipment according to an embodiment of the invention.

FIG. 3 is a flow diagram of the steps of a location method in a satellite system according to the invention. It is implemented in a satellite communications system comprising a satellite such as the satellite 101, incorporating a device 200 making it possible to acquire a signal on a plurality of radiating elements, then to retransmit them to a ground station for the implementation of goniometry processing operations. The method comprises:
  a step 301 of calibration of the satellite communications system. This step comprises:

a substep 302 of transmission of a calibration signal from a satellite station whose position is known, a substep 303 of reception of the calibration signal on a plurality of radiating elements, of frequency multiplexing of the calibration signals received on said radiating elements and of retransmission of the frequency-multiplexed calibration signals, by the device dedicated to locating RF equipments of the satellite, a substep 304 of reception, by a satellite station, of the frequency-multiplexed calibration signals retransmitted by the satellite, a substep 305, performed by the satellite station having received the signals and/or a processing device to which the signals are transmitted, of demultiplexing and of digitization of said calibration signals, and of implementation of goniometry processing operations on the demultiplexed and digitized calibration signals, so as to determine a direction of arrival of the calibration signal, to calculate a position of the satellite station transmitting the calibration signal by using the direction of arrival, the positioning and the orientation of the satellite, then to calculate a calibration deviation between the known position of the satellite station transmitting the calibration signal and the position of the satellite station transmitting the calibration signal determined using the goniometry processing operations.

The method according to an embodiment of the invention also comprises one or more steps 310 of determining the position of an RF transmitter transmitting an interfering signal. This step comprises:

a substep 311 of reception of an RF signal comprising the interfering signal on a plurality of radiating elements, of frequency multiplexing of the RF signals received on said radiating elements and of retransmission of the frequency-multiplexed RF signals, by the device dedicated to locating RF equipments of the satellite, a substep 312 of reception, by a satellite station, of the frequency-multiplexed RF signals transmitted by the satellite, a substep 313 of demultiplexing and of digitization of said RF signals, of implementation of a goniometry algorithm on the demultiplexed and digitized RF signals so as to determine a direction of arrival of the interfering signal, to calculate a position of the radiofrequency equipment transmitting said interfering signal, and of correction of the calculated position by the calibration deviation, implemented by the satellite station and/or computation means to which it is linked.

The invention claimed is:

1. A satellite configured to operate radiofrequency, RF, communications from one or more antenna systems, further comprising a device dedicated to locating RF equipments, said device dedicated to locating RF equipments comprising:

a reception antenna comprising a plurality N of radiating elements configured to receive an RF signal, analogue means for frequency multiplexing the N RF signals received on the N radiating elements, configured to transpose said N RF signals received on the N radiating elements around distinct centre frequencies distributed into a given frequency band and to combine them, means for transmitting the N frequency-multiplexed RF signals to a satellite station on the ground for the implementation of goniometry processing operations.

2. The satellite according to claim 1, wherein the analogue means for frequency multiplexing the N RF signals received on the N radiating elements comprise N analogue bandpass filters having substantially identical bandwidths (BW) and N analogue transposition means configured to transpose said signals such that the deviation between two centre frequencies of transposed signals is greater than or equal to the bandwidth (BW) of the N analogue bandpass filters.

3. The satellite according to claim 1, configured such that the frequency band in which the N frequency-multiplexed RF signals are retransmitted is reserved for these retransmissions.

4. The satellite according to claim 1, wherein the number N of radiating elements of the reception antenna of the device dedicated to locating RF equipments is less than 10.

5. The satellite communications system allowing a radiofrequency transmitter to be located, comprising a satellite according to claim 1, and one or more satellite stations on the ground, configured to make it possible together to calibrate the system by:

the transmission of a calibration signal from a satellite station whose position is known, the reception of said calibration signal on a plurality of radiating elements, the frequency multiplexing of the calibration signals received on said plurality of radiating elements and the retransmission of the frequency-multiplexed calibration signals, by the device dedicated to locating RF equipments of the satellite, the reception, by a satellite station, of the frequency-multiplexed calibration signals retransmitted by the satellite, the demultiplexing and the digitization of said calibration signals, and the implementation of goniometry processing operations on the demultiplexed and digitized calibration signals, so as to determine a direction of arrival of the calibration signal, a position of the satellite station transmitting the calibration signal, then a calibration deviation between the known position of the satellite station transmitting the calibration signal and the position of the satellite station transmitting the calibration signal determined using the goniometry processing operations;

then to make it possible together to determine the position of an RF equipment transmitting an interfering signal by:

the reception of an RF signal comprising said interfering signal on a plurality of radiating elements, the frequency multiplexing of the RF signals received on said plurality of radiating elements and the retransmission of the frequency-multiplexed RF signals, by the device dedicated to locating RF equipments of the satellite, the reception, by a satellite station, of the frequency-multiplexed RF signals transmitted by the device dedicated to locating RF equipments of the satellite, the demultiplexing and the digitization of said frequency-multiplexed RF signals, the implementation of a goniometry algorithm on the demultiplexed and digitized RF signals so as to determine a direction of arrival of the interfering signal, the calculation of a position of the RF equipment transmitting said interfering signal, and the correction of the calculated position by the calibration deviation.

6. A method for determining the position of a radiofrequency equipment in a satellite communications system comprising a satellite according to claim 1, and one or more satellite stations on the ground, comprising:

a step of calibration of said satellite communications system, by:

a substep of transmission of a calibration signal from a satellite station whose position is known, a substep of reception of the calibration signal on a plurality of radiating elements, of frequency multiplexing of the calibration signals received on said plurality of radiating elements and of retransmission of the frequency-multiplexed calibration signals, by the device dedicated to locating RF equipments of the satellite, a substep of reception, by a satellite station, of the frequency-multiplexed calibration signals retransmitted by the satellite, a substep of demultiplexing and of digitization of said calibration signals, and of implementation of goniometry processing operations on the demultiplexed and digitized calibration signals, so as to determine a direction of arrival of the calibration signal, a position of the satellite station transmitting the calibration signal, then a calibration deviation between the known position of the satellite station transmitting the calibration signal and the position of the satellite station transmitting the calibration signal determined using the goniometry processing operations;

one or more steps of determination of the position of an RF transmitter transmitting an interfering signal, by:

a substep of reception of an RF signal comprising said interfering signal on a plurality of radiating elements, of frequency multiplexing of the RF signals received on said plurality of radiating elements and of retransmission of the frequency-multiplexed RF signals, by the device dedicated to locating RF equipments of the satellite, a substep of reception, by a satellite station, of the frequency-multiplexed RF signals transmitted by the device dedicated to locating RF equipments of the satellite, a substep of demultiplexing and of digitization of said frequency-multiplexed RF signals, then of implementation of goniometry processing operations on the demultiplexed and digitized RF signals so as to determine a direction of arrival of the interfering signal, of calculation of a position of the radiofrequency equipment transmitting said interfering signal, and of correction of the calculated position by the calibration deviation.

* * * * *